US010249012B2

(12) United States Patent
Oteng-Attakora

(10) Patent No.: US 10,249,012 B2
(45) Date of Patent: Apr. 2, 2019

(54) COORDINATION OF PAYMENT OF PATIENT HEALTHCARE IN DEVELOPING COUNTRIES BY FAMILY MEMBERS LIVING ABROAD

(71) Applicant: George Oteng-Attakora, Ogden, UT (US)

(72) Inventor: George Oteng-Attakora, Ogden, UT (US)

( * ) Notice: Subject to any disclaimer, the term of this patent is extended or adjusted under 35 U.S.C. 154(b) by 344 days.

(21) Appl. No.: 14/279,631

(22) Filed: May 16, 2014

(65) Prior Publication Data

US 2014/0365237 A1  Dec. 11, 2014

Related U.S. Application Data

(60) Provisional application No. 61/831,984, filed on Jun. 6, 2013.

(51) Int. Cl.
| | | |
|---|---|---|
| *G06Q 50/00* | (2012.01) | |
| *G06Q 10/00* | (2012.01) | |
| *G06Q 20/00* | (2012.01) | |
| *G06Q 50/22* | (2018.01) | |
| *G06Q 20/10* | (2012.01) | |
| *G06Q 90/00* | (2006.01) | |
| *G06Q 10/10* | (2012.01) | |
| *G06F 19/00* | (2018.01) | |

(52) U.S. Cl.
CPC ............. *G06Q 50/22* (2013.01); *G06F 19/00* (2013.01); *G06Q 10/10* (2013.01); *G06Q 20/102* (2013.01); *G06Q 90/00* (2013.01)

(58) Field of Classification Search
CPC ....... G06Q 50/22; G06Q 20/102; G06Q 10/10
USPC .......................................................... 705/2
See application file for complete search history.

(56) References Cited

U.S. PATENT DOCUMENTS

| 6,796,497 B2 * | 9/2004 | Benkert | G06Q 20/227 |
| | | | 235/379 |
| 2011/0251848 A1 * | 10/2011 | Alameddine | G06F 19/322 |
| | | | 705/2 |
| 2013/0346309 A1 * | 12/2013 | Giori | G06Q 20/0655 |
| | | | 705/43 |

OTHER PUBLICATIONS

Agunias et al.; Development a Road Map for engaging diaspora in development, 2012, IOM.*
Smith et al., Trade-in health-related services, Feb. 2009, The Lancet, vol. 373, issue 9663, pp. 593-601.*

* cited by examiner

*Primary Examiner* — Hiep V Nguyen
(74) *Attorney, Agent, or Firm* — Workman Nydegger

(57) ABSTRACT

Methods, systems, and computer program products for the coordination of payment of medical goods and/or services of patients in developing countries by relatives of those individuals living abroad, such as in the diaspora of particular cultures or nationalities.

7 Claims, 6 Drawing Sheets

COORDINATION OF PAYMENT OF PATIENT HEALTHCARE IN DEVELOPING COUNTRIES BY FAMILY MEMBERS LIVING ABROAD

CROSS REFERENCE TO RELATED APPLICATIONS

This application claims priority to U.S. Provisional Patent Application No. 61/831,984 filed Jun. 6, 2013, which is hereby incorporated by reference in its entirety.

BACKGROUND OF THE INVENTION

1. The Field of the Invention

The present invention relates to methods, systems, and computer program products for making medical payments for others. More specifically, the present invention relates to the coordination of payment of healthcare of patients in developing countries by the patients' family members living abroad.

2. The Relevant Technology

Millions of Children and adults in the third world die every year from diseases readily treated by essential drugs. Mr. Kofi Annan, former UN Secretary General, estimates that one-third of the world's population lacks regular access to essential drugs and that the figure rises to over 50% in the poorest parts of Africa and Asia. This leads to a much higher mortality rate in those countries, especially for children. In Ghana, for example, an average of one child in every ten dies before the age of five compared to one in every 150 in the UK. This is a result of poor healthcare provision in most developing countries. The average per capita amount spent in Switzerland on health services is over $6,000 per year compared to an average of less than $40 in West Africa. The yearly per capita average for Ghana is $66, for Niger is $19, for Haiti is $44, and for Liberia is $29. In contrast, the U.S. spends nearly $8,000 per capita per year. Because of the significantly lower spending, the poorest countries carry the greatest burden of ill health. The impact is particularly profound with devastating contagious widespread diseases, such as HIV infection.

For most developing countries total government spending on healthcare is minimal. Healthcare cost is supplemented by foreign aid and immigrant remittances to their home countries. In 2007 contribution from external sources was a little less than 25% of total health expenditure; with most developing countries struggling economically, it means most people don't have access to healthcare.

More than 3% of the world's population lives outside their countries of birth. Remittances, the money sent home by immigrants, provide an important lifeline for poor households. According to the World Bank, 11 billion dollars was remitted worldwide in 2001. In 2011, remittances to developing countries were estimated at $372 billion. Of this amount, about 65 percent went to developing countries, with half of that money going to countries considered to be 'lower-middle income countries.' Of this amount about 50% is intended to be used for healthcare and prescription medications. But for most families, the money is transferred through third party individuals. Because of this, some or all of the money is often not received by the intended recipient or is used for other things than what it was intended. As a result individuals in most developing countries of the world, especially those in Africa, do not receive the medications they need, often relying instead on local unorthodox medical practices, counterfeit medicine, and unregulated concoctions, which further adds to medical complications and poor health (morbidity and mortality).

Furthermore, due to the financial loss through third parties, those who purchase medication often do not purchase enough to complete the rational course of the treatment (e.g., a full course of antibiotics treatment), rendering the drug ineffective at treating the targeted illness; a prognosis that leads to increased poor health and the development of superbugs that become resistant to the antibiotics.

The cost of transferring money in itself also represents a significant loss to immigrants and their families. The Inter-American Development bank estimates that the total cost of sending remittances to Latin America and the Caribbean reached $4 billion in 2002, or about 12.5 percent of the remittance to that region. It is estimated that the total cost of the average money transfer ranges between 15 and 20 percent. This is a huge loss to what could go towards the cost of healthcare.

A 2012 report generated by the World Health Organization (WHO) recommends three approaches to making healthcare service affordable and accessible:

1. Make health a higher priority in existing spending, particularly in a government's budget;
2. Find new or diversified sources of domestic funding; and
3. Increase external financial support.

For all countries, steps 1 and 2 are very important. But for struggling developing countries, step 3 cannot be denied. Embodiments of the present invention provide a platform to facilitate step 3 while solving many of the above problems by bringing the patient, the payee and the provider together to coordinate medical care and corresponding payments.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope. In the drawings, like numerals designate like elements. Furthermore, multiple instances of an element may each include separate letters appended to the element number. For example two instances of a particular element "20" may be labeled as "20a" and "20b". In that case, the element label may be used without an appended letter (e.g., "20") to generally refer to every instance of the element; while the element label will include an appended letter (e.g., "20a") to refer to a specific instance of the element.

DETAILED DESCRIPTION OF THE PREFERRED EMBODIMENTS

Figure 1:
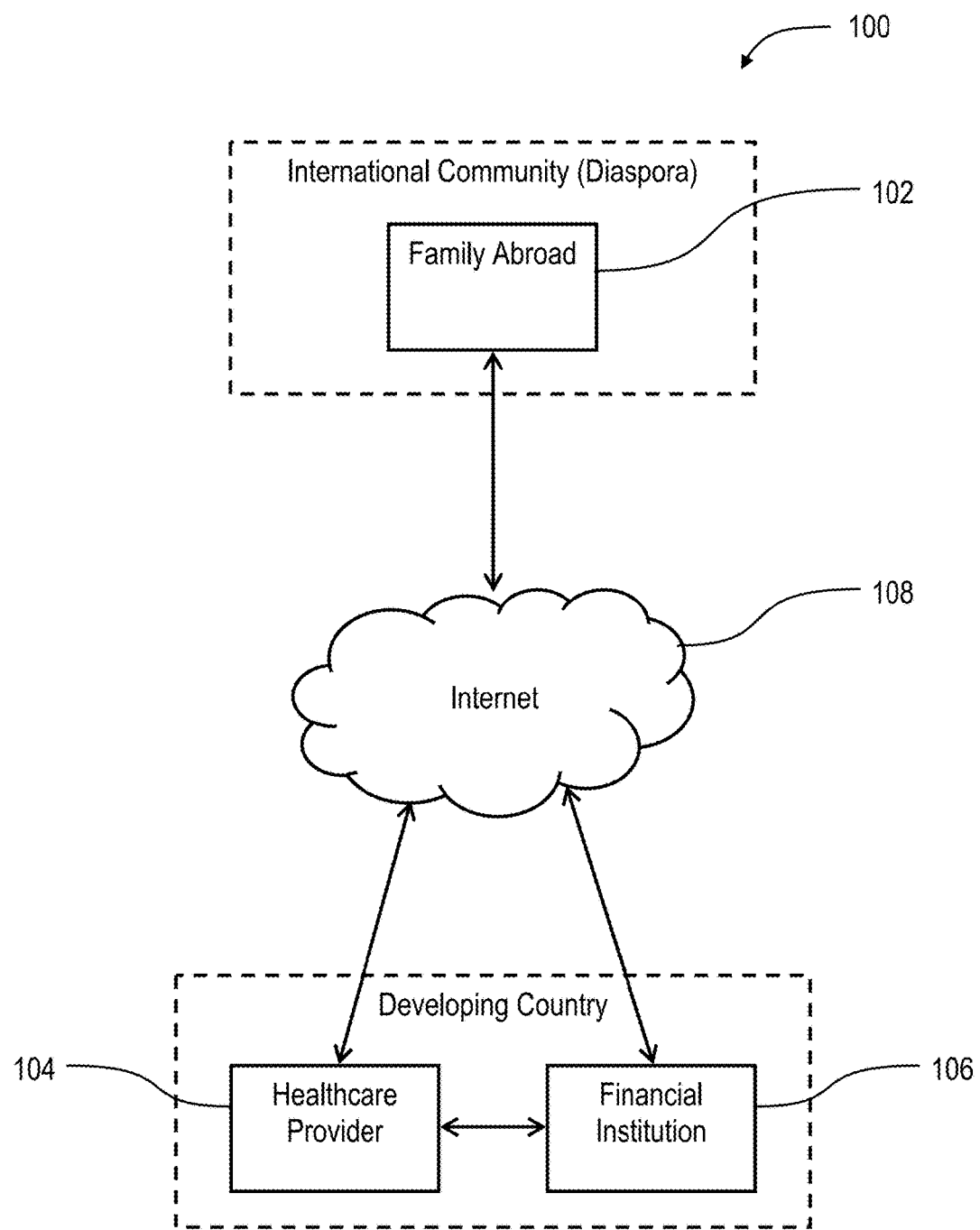
FIG. 1 is a block diagram depicting the main user groups of a system incorporating features of the present invention according to one embodiment.

In the following detailed description, reference is made to the accompanying drawings, which form a part hereof. In the drawings, similar symbols typically identify similar components, unless context dictates otherwise. The embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. It will also be understood that any reference to a first, second, etc. element in the claims or in the detailed description is not meant to imply numerical sequence, but is meant to distinguish one element from another unless explicitly noted otherwise.

In addition, as used in the specification and appended claims, directional terms, such as "top," "bottom," "up," "down," "upper," "lower," "proximal," "distal," "horizontal," "vertical," and the like are used herein solely to indicate relative directions and are not otherwise intended to limit the scope of the invention or claims.

The present application relates to methods, systems, and computer program products for the coordination of payment of medical goods and/or services of individuals in developing countries by relatives of those individuals living abroad, such as in the diaspora of particular cultures or nationalities. Embodiments of the present invention mitigate or solve many of the problems endemic in existing approaches.

As discussed above, millions of Children and adults in the third world die every year from diseases readily treated by essential drugs. Mr. Kofi Annan, former UN Secretary General, estimates that one-third of the world's population lacks regular access to essential drugs and that the figure rises to over 50% in the poorest parts of Africa and Asia. This leads to a much higher mortality rate in those countries, especially for children. In Ghana, for example, an average of one child in every ten dies before the age of five compared to one in every 150 in the UK. This is a result of poor healthcare provision in most developing countries. The average per capita amount spent in Switzerland on health services is over $6,000 per year compared to an average of less than $40 in West Africa. The yearly per capita average for Ghana is $66, for Niger is $19, for Haiti is $44, and for Liberia is $29. In contrast, the U.S. spends nearly $8,000 per capita per year. Because of the significantly lower spending, the poorest countries carry the greatest burden of ill health. The impact is particularly profound with devastating contagious widespread diseases, such as HIV infection.

For most developing countries total government spending on healthcare is minimal. Healthcare cost is supplemented by foreign aid and immigrant remittances to their home countries. In 2007 contribution from external sources was a little less than 25% of total health expenditure; with most developing countries struggling economically, it means most people don't have access to healthcare.

According to the World Bank, 11 billion dollars was remitted worldwide in 2001. In 2011, remittances to developing countries were estimated at $372 billion. Of this amount, about 65 percent went to developing countries, with half of that money going to countries considered to be 'lower-middle income countries.' Of this amount about 50% is intended to be used for healthcare and prescription medications. But for most families, the money is transferred through third party individuals. Because of this, some or all of the money is often not received by the intended recipient or is used for other things than what it was intended. As a result individuals in most developing countries of the world, especially those in Africa, do not receive the medications they need, often relying instead on local unorthodox medical practices, counterfeit medicine, and unregulated concoctions, which further adds to medical complications and poor health (morbidity and mortality).

Furthermore, due to the financial loss through third parties, those who purchase medication often do not purchase enough to complete the rational course of the treatment (e.g., a full course of antibiotics treatment), rendering the drug ineffective at treating the targeted illness; a prognosis that leads to increased poor health and the development of superbugs that become resistant to the antibiotics.

The cost of transferring money in itself also represents a significant loss to immigrants and their families. The Inter-American Development bank estimates that the total cost of sending remittances to Latin America and the Caribbean reached $4 billion in 2002, or about 12.5 percent of the remittance to that region. It is estimated that the total cost of the average money transfer ranges between 15 and 20 percent. This is a huge loss to what could go towards the cost of healthcare.

A 2012 report generated by the World Health Organization (WHO) recommends three approaches to making healthcare service affordable and accessible:
  4. Make health a higher priority in existing spending, particularly in a government's budget;
  5. Find new or diversified sources of domestic funding; and
  6. Increase external financial support.

For all countries, steps 1 and 2 are very important. But for struggling developing countries, step 3 cannot be denied. Embodiments of the present invention provide a platform to facilitate step 3 while solving many of the above problems by bringing the patient, the payee and the provider together to coordinate medical care and corresponding payments.

Embodiments of the present invention mitigate or solve many of the above problems. For example, embodiments of the present invention increase healthcare availability and affordability by using modern technology to connect immigrant families abroad direct to the healthcare providers being used by the families' relatives in the developing countries. This provides many benefits, such as avoiding delays in healthcare remittances, eliminating transfer charges, and ensuring immigrant healthcare support goes directly to cover healthcare cost and the right medication administered to promote rational use of medicine.

In one embodiment, to coordinate the payment from abroad of healthcare received in a developing country, a novel software application named 'eMedipay' is made available on the internet. eMedipay is an internet based payment system specially designed to make it easier for those in the International Community (Diaspora) to contribute towards the healthcare cost of families and loved ones. eMedipay can be used to network healthcare providers in developing countries. eMedipay can also serve as an interface between the healthcare providers and the payees, for example between families and friends in the International Community (Diaspora) and the healthcare provider in the developing country. Payment can be made by the payee using the internet.

FIG. 1 is a block diagram 100 depicting the main user groups in eMedipay. As shown, a family abroad 102 in the Diaspora can connect with a healthcare provider 104 of a relative or loved one back home in the developing country to coordinate healthcare payments directly to the healthcare provider 104 or to the provider's financial institution 106 via the internet 108. By way of example and not limitation, healthcare providers can include: clinics, pharmacies, dentists, medical labs, vision professionals, group homes and hospitals.

The eMedipay structure represents the first global solution for people in the international community to facilitate access to healthcare by linking dependents to specific healthcare providers. It presents a new level of innovation in using e-commerce to bring the payee, the patient and the healthcare provider to the same platform to effect payment; thus promoting global healthcare, connecting families worldwide, promoting healthcare availability and promoting healthcare affordability.

Specific benefits realized by families that use eMedipay can include:

- Online transactions ensure that funds sent for the purposes of healthcare are used for those purposes. eMedipay can ensure online payment that goes directly to the financial institution used by the healthcare provider. This provides great traceability and militates against money laundering.
- Online transactions are generally instantaneous and require no middleman. This can save families the 15-20% transfer cost generally charged by third-party payment services.
- eMedipay facilitates patients care. In some countries where the so called 'cash & carry' is the order of the day, assurance of payment through eMedipay ensures that patients get treated immediately.
- Because networked healthcare providers know that they will be paid quickly, providers are willing to provide special discounts to patients using eMedipay.
- Families in the International Community (Diaspora) are assured that healthcare costs do not become a barrier to the survival of their loved ones.

In one embodiment, a Payment Protection Plan (PPP) can be used where families are preregistered to cover health care cost for designated family members. As a result of PPP, a healthcare provider can be guaranteed payment. As such, the healthcare provider is willing to treat the designated family members even before payment is made.

Specific benefits realized by healthcare providers that use eMedipay can include:

- eMedipay offers healthcare providers (doctors, pharmacists, dentists, eye specialists, clinical laboratories, etc.) a platform to receive much needed cash to run their businesses and provide optimum care for patients.
- eMedipay gives healthcare providers peace of mind; because eMedipay is an on-line application, no paper work is involved and no one needs to chase after unpaid bills.
- eMedipay can deposits funds directly into the financial account of the healthcare provider.
- eMedipay facilitates collection of accounts payable, thus, improving business cash flow of the healthcare provider.
- eMedipay can increase global recognition of a healthcare provider by advertising the provider's business on the Internet.

Figure 2:
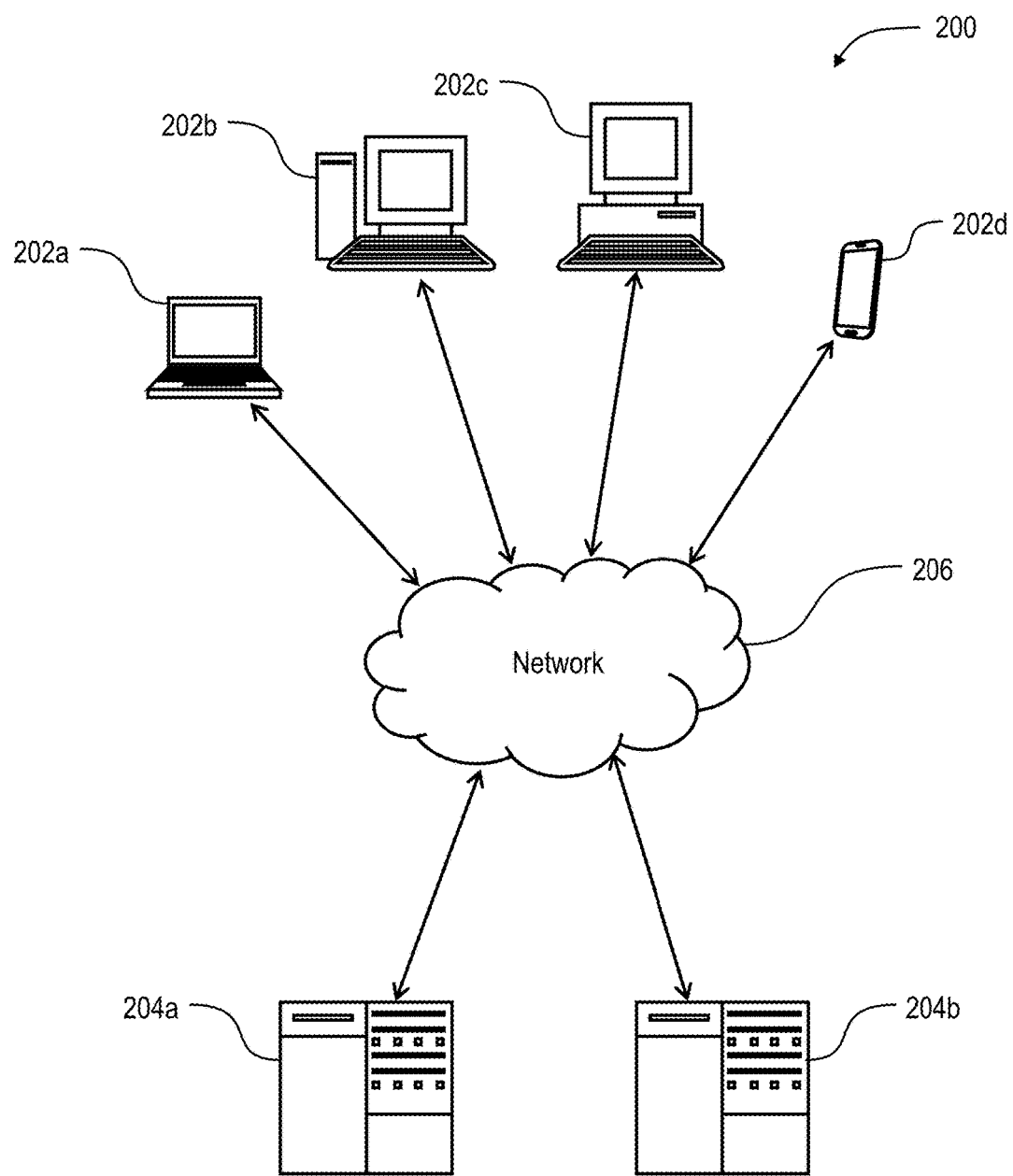
FIG. 2 is a block diagram of a network system according to one embodiment.

FIG. 2 depicts an example of a network system 200 that can incorporate elements of the present invention. Network system 200 is exemplary only and does not show every element envisioned in every system. One skilled in the art will appreciate that network system 200 can be modified and optimized based on the individual needs of the particular users. Network system 200 can include one or more client machines 202*a-d* (generally referred to herein as client machine(s) 202 or client(s) 202) in communication with one or more server machines 204*a-b* (generally referred to herein as server machine(s) 204 or server(s) 204) over a network 206. The client machine(s) 202 can, in some embodiments, be referred to as a single client machine 202 or a single group of client machines 202, while the server machine(s) 204 may be referred to as a single server 204 or a single group of servers 204. Although four client machines 202 and two server machines 204 are depicted in FIG. 1, any number of clients 202 may be in communication with any number of servers 204. In addition, although a single network 206 is shown connecting client machines 202 to server machines 204, it should be understood that multiple, separate networks may connect a subset of client machines 202 to a subset of server machines 204. If desired, client machine 202 and server machine 204 can be combined into one physical machine.

Embodiments of the present invention, including client machines 202 and server machines 204, may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two different types of computer-readable media: computer storage media and transmission media.

Computer storage media includes RAM, ROM, EEPROM, CD-ROM, solid state drives ("SSDs") (e.g., based on RAM), flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired and wireless) to a computer, the computer properly views the connection as a transmission medium. Transmission media can include network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface controller (NIC)), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

By way of example, and not limitation, common network environments 206 that can be used with the present invention include Local Area Networks ("LANs"), Wide Area Networks ("WANs"), and the Internet. Accordingly, each of the computer systems as well as any other connected computer systems and their components, can create message related data and exchange message related data as needed (e.g., Internet Protocol ("IP") datagrams and other higher layer protocols that utilize IP datagrams, such as, Transmission Control Protocol ("TCP"), Hypertext Transfer Protocol ("HTTP"), User Datagram Protocol ("UDP"), etc.) over the network 206.

Those skilled in the art will appreciate that the invention may be practiced in network computing environments with many types of computer system configurations. By way of example and not limitation, client machines 202 and server machines 204 can include: personal computers, desktop computers, laptop computers, message processors, hand-held devices, multi-processor systems, microprocessor-based or programmable consumer electronics, network PCs, minicomputers, mainframe computers, portable tablet devices, mobile telephones, PDAs, video game consoles, portable media players, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. Program modules for one entity can be located and/or run in another entity's data center or "in the cloud."

An operating environment for the devices of system 200 may comprise or utilize a processing system having one or more microprocessors and system memory. In accordance with the practices of persons skilled in the art of computer programming, embodiments of the present invention are described below with reference to acts and symbolic representations of operations or instructions that are, at least in part, performed by the processing system. Such acts and operations or instructions may be referred to as being "computer-executed," "CPU-executed," or "processor-executed."

Each client machine 202 can correspond to a healthcare provider in a developing country, a financial institution of one of those healthcare providers, or a family member, living abroad, supporting a patient of one of those healthcare providers. The location of each of the client machines 202 will therefore depend on the respective user. However, due to the global reach of many networks, in particular the Internet, all of those client machines may be able to communicate with one another. Other correspondences are also possible.

Figure 3:
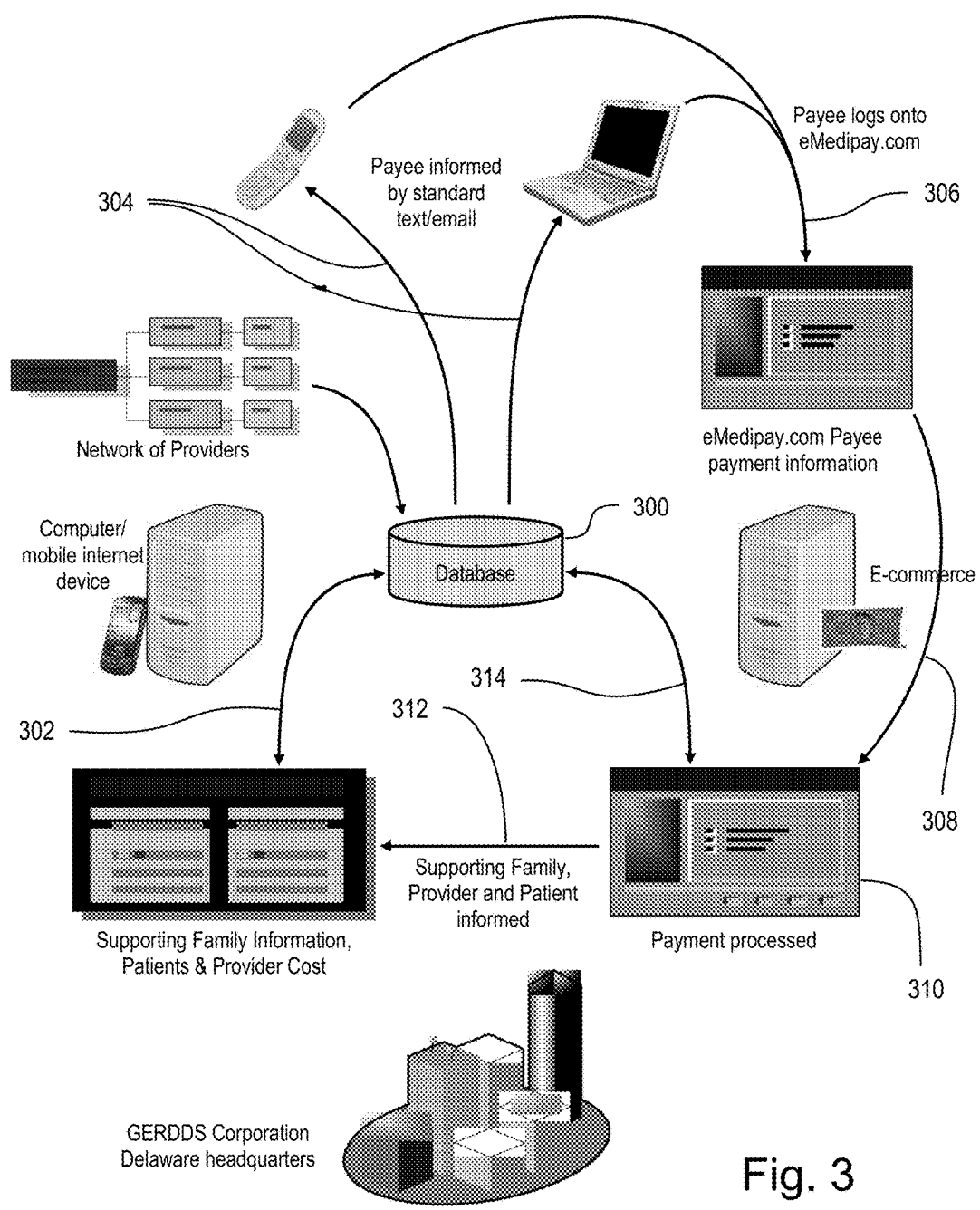
FIG. 3 is a data flow diagram of a system according to one embodiment.

FIG. 3 depicts a data flow diagram of system 100 according to one embodiment. As shown, eMedipay uses a central database 300 to store information regarding the different user groups of the system. The central database 300 can be a single database or multiple databases that are linked together. Furthermore, the single or multiple databases can be positioned in one location or can be distributed among multiple locations.

The central database 300 has stored therein information for each healthcare provider registered with the system, such as name, address, financial institution, etc. The central database includes information for each patient registered with the system, such as name, address, etc. The central database includes information for each family member or other entity abroad that has agreed to be responsible for payment of healthcare fees for a registered patient, such as name, address, credit card information, financial information, etc. The database also includes information to link each family member to a particular registered patient. That way, when a registered patient incurs an expense with a registered healthcare provider, the appropriate family member can be contacted for payment.

Using a pharmacy shop as an example, a patient can take a prescription to a pharmacy shop in a developing country, such as Ghana. The details of the prescription are entered (302) into the eMedipay system by the pharmacy shop and stored in the common database 300. An invoice is generated and a notice is electronically sent (304) to a family member abroad who has been previously set up to be associated with the patient. The notice can be sent by text or email or any other method. The family member can then log onto (306) the eMedipay system from abroad and view the invoice from the pharmacy shop stored in the database. The family member can pay (308) all or part of the invoice using the eMedipay system via credit card, bank account, third-party funds, or any other type of electronic funds transfer. The funds are transferred (310) to the pharmacy shop or the financial institution used by the pharmacy shop and the parties involved are notified (312) of the payment and the database is updated (314).

Figure 4A:
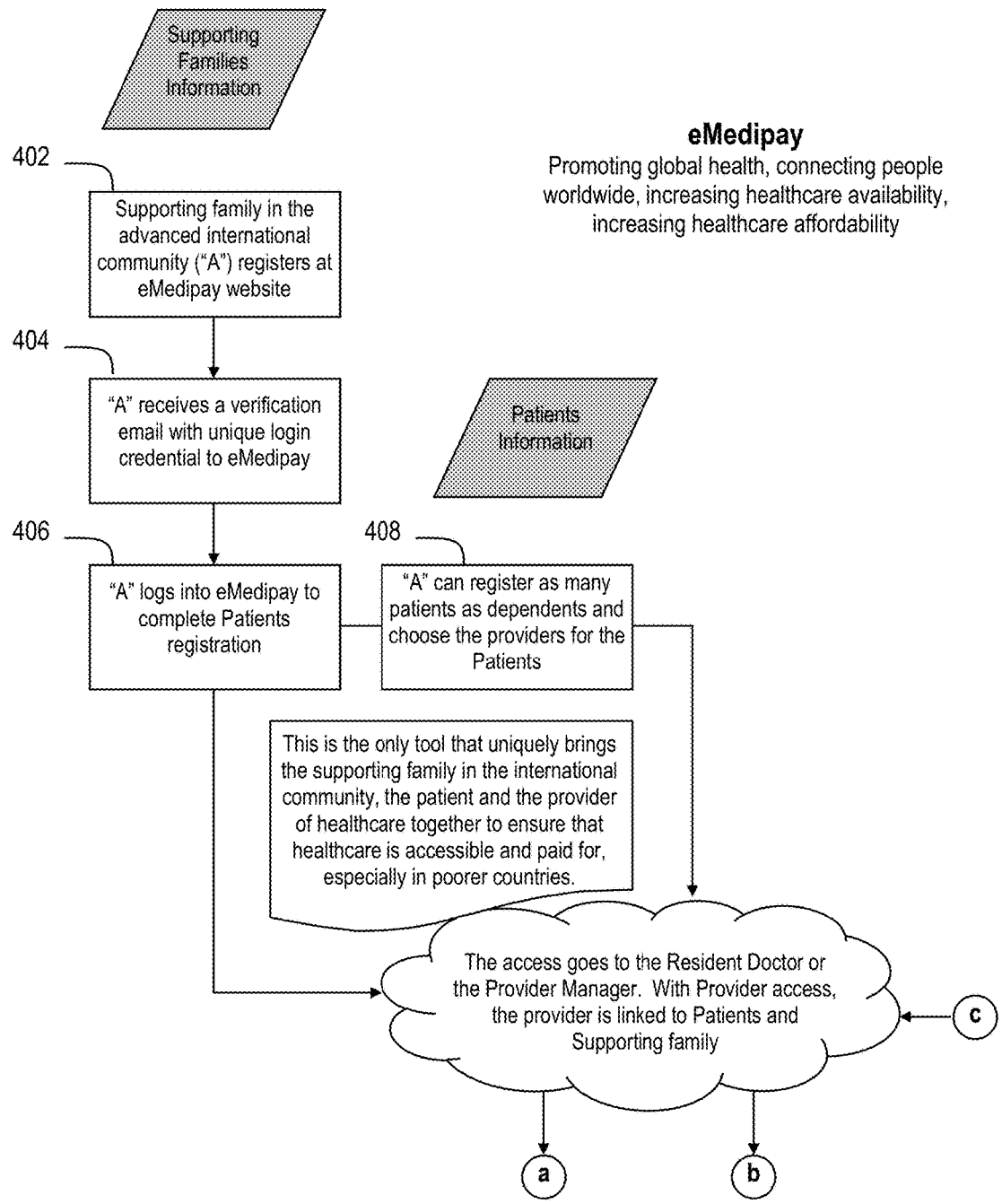
FIGS. 4A-4C illustrates methods of i) registering a supporting family and corresponding patients, ii) registering a healthcare provider, and iii) coordinating payment from abroad of healthcare services provided by the healthcare provider to the patient, according to one embodiment.
Figure 4B:
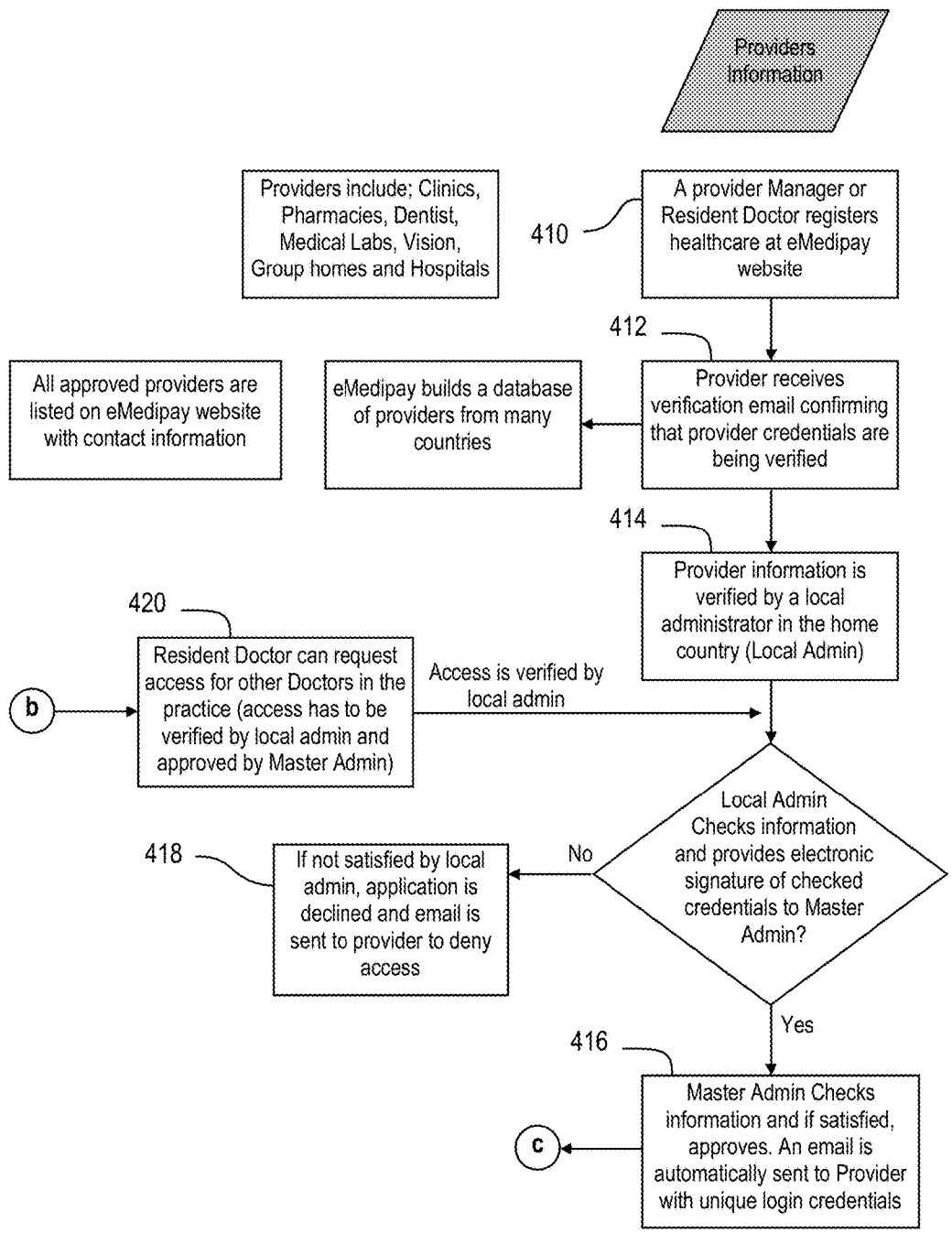
Figure 4C:
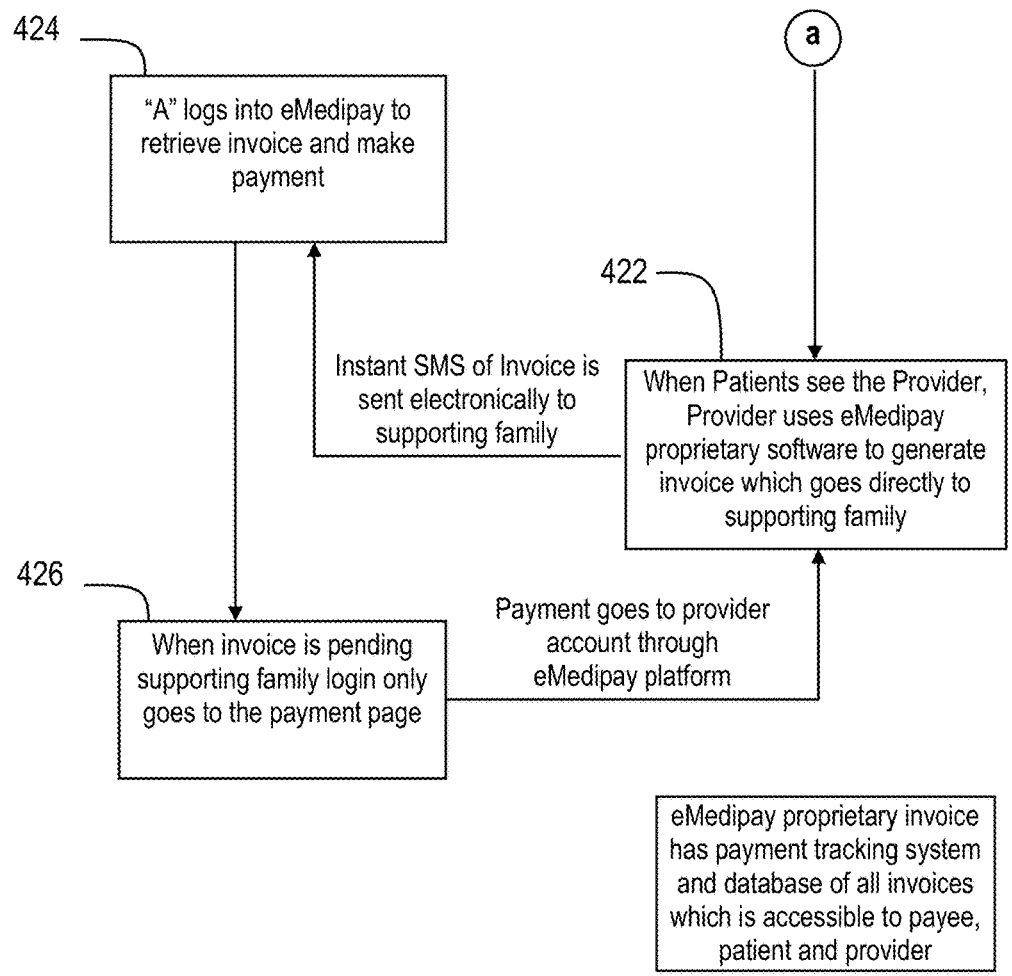

FIGS. 4A-4C illustrate methods of i) registering a supporting family and corresponding patients, ii) registering a healthcare provider, and iii) coordinating payment from abroad of healthcare services provided by the healthcare provider to the patient, according to one embodiment. The steps performed by a supporting family member or a healthcare provider can be performed using client machines 202. Other steps can be performed by others with or without the use of client machines 202. In one embodiment, the steps comprise one or more computer applications. In one embodiment, method 400 is performed using the internet.

Steps 402-408 correspond to a method of registering a supporting family and corresponding patients according to one embodiment. For a supporting family member abroad to be responsible for payment of healthcare funds for a patient, the family member first registers with the system (step 402). During registration, the family member may be required to enter any or all of the following: name, address, credit card information, financial information, etc. The information is stored in the eMedipay database.

A verification message is sent to the family member confirming that the family member is registered (step 404). Verification can take the form of a text message, email, or any other form of communication. The verification can include a unique login credential (e.g., username and password) for the family member.

The family member must also be linked to a patient to be able to be responsible for that patient. In one embodiment, the family member can enter the patient information initially into the system (step 406). This can include any or all of the following: patient's name, address, etc. The information is stored in the eMedipay database. In one embodiment, if the patient information is already in the system, the family member can simply select the patient from a list or perform a search. Either way, the family member is then linked to the patient so as to be responsible for payment of healthcare bills.

In one embodiment, the family member can register as many patients as they would like and can select the providers that each patient can visit (step 408). The family member is then linked to each of the registered patients they have entered.

Steps 410-420 correspond to a method of registering a healthcare provider according to one embodiment. Before a healthcare provider in a developing country can be visited or paid, the healthcare provider must also be registered in the system. To do this, the healthcare provider requests to be registered (step 410).

A verification message is sent to the healthcare provider informing the healthcare provider that the provider's credentials are being verified (step 412). Verification can take the form of a text message, email, or any other form of communication.

The healthcare provider's information and credentials are reviewed by a local administrator in the developing country (step 414). The reviewed information and credentials of the provider can include the name and address of the provider, the type of service provided, the reputation of the provider, etc.

If the healthcare provider's information and credentials are found to be satisfactory by the local administrator, a master administrator reviews the information (step 416). If the healthcare provider's information and credentials are found to be satisfactory by the master administrator, the healthcare provider is registered in the system, and a verification message is sent to the healthcare provider confirming that the healthcare provider is registered. Verification can take the form of a text message, email, or any other form of communication. The verification can include a unique login credential (e.g., username and password) for the healthcare provider. The registration status of the healthcare provider, as well as the provider's information and credentials are stored in the eMedipay database.

If the healthcare provider's information and credentials are not found to be satisfactory by either administrator, the healthcare provider is not registered and a message is sent to the healthcare provider denying registration (step 418). The denied registration status of the healthcare provider, as well as the provider's information and credentials can be stored in the eMedipay database. In some embodiments, only one admin can review the information and credentials instead of two.

In one embodiment, a resident doctor of a healthcare provider facility can request other healthcare providers of the facility be registered with the system (step 420). The same steps as discussed above are followed to register the other healthcare providers.

Steps 422-426 correspond to a method of coordinating payment from abroad of healthcare goods and/or services provided by the healthcare provider to the patient according to one embodiment. Once a patient, a corresponding supporting family member, and a healthcare provider of the patient are registered, the system can be used to coordinate payment from abroad of healthcare services provided by the healthcare provider to the patient, as discussed above.

For example, the patient can visit the registered healthcare provider to receive goods and/or services from the provider. The healthcare provider can log on to the system and generate an invoice corresponding to the goods and/or services provided to the patient (step 422).

The system can automatically generate and electronically send a notice of the invoice to the family member abroad who is linked to the patient (step 424). As discussed above, the notice can be via text message, email, or any other type of communication.

The family member can log on to the system to retrieve and authorize the invoice to be paid (step 426), as discussed above. Payment is then made to the healthcare provider.

In one embodiment, if an invoice is pending, the supporting family member is directed to a payment page upon login to remind the family member of the pending invoice (step 428).

Although discussion herein has been directed to coordinating healthcare payments abroad, it is appreciated that other types of payments abroad can be coordinated using the methods or variations thereof. For example, methods of the present invention can be used to coordinate payments to schools and university campuses abroad. That is, supporting families can directly cover fees and expenses for loved ones attending school in developing countries. Most schools in the developing world do not have their own internet portal for supporting families to make direct payment online. The eMedipay structure can provide a virtual portal for the schools to facilitate payment by supporting families abroad. A cash back option can also be included where the overage of payment made by the supporting families goes to the beneficiary The present invention may be embodied in other specific forms without departing from its spirit or essential characteristics. Accordingly, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of effecting direct and secure payment for patient healthcare in a developing country by a payer located outside the developing country, the method being implemented by a global database application on a networked computing platform including client machines and a central database, the method comprising:

the global database application instantiating a first local application on a first client machine that facilitates electronic communication between the first client machine and the central database to electronically register, at the central database, a payer located outside the developing country and a patient in the developing country with the global database application, and to electronically identify a healthcare provider in the developing country that can be used by the patient to receive healthcare in the developing country;

the global database application instantiating a second local application on a second client machine that facilitates electronically communication between the central database and the second client machine to electronically register, at the central database, the healthcare provider in the developing country with the global database application;

the global database application electronically establishing a monetary link between the payer and the healthcare provider by electronically linking a first financial institution of the payer with a second financial institution of the provider so that direct electronic transfer of funds can be executed by the global database application between the first financial institution and the second financial institution upon verifying that healthcare services have been provided by the healthcare provider to the patient;

the global database application generating and electronically sending verification to one or more client machines that the monetary link has been established and that the payer is responsible for payment of healthcare charges for healthcare provided to the patient by the healthcare provider;

the global database generating an electronic invoice in response to a client computer receiving input from the healthcare provider upon providing healthcare to the patient and electronically sending notification of the electronic invoice to a client computer of the payer;

the global database application electronically establishing a communication and payment interface communicating through the central database with a client computer of the payer for initiating electronic payment of the electronic invoice from the first financial institution of the payer to the second financial institution of the healthcare provider;

the global database application executing payment of the electronic invoice, via the communication and payment interface, by initiating direct electronic transfer of funds from the first financial account associated with the payer to the second financial account associated with the healthcare provider; and the global database application sending electronic verification to one or more client computers that the payment was applied to the electronic invoice.

2. The method recited in claim 1, wherein electronically registering the payer comprises:

receiving, by the first client machine of the payer, a request for verification generated by the global database application; and responding, by the payer at the first client machine, to the request for verification.

3. The method recited in claim 1, wherein the patient is registered by the registered payer.

4. The method recited in claim 1, wherein the healthcare provider is registered at the second client machine by a provider manager or resident doctor.

5. The method recited in claim 1, wherein the healthcare provider comprises one or more of: a clinic, a pharmacy, a dentist, a medical lab, a vision provider, a group home, or a hospital.

6. The method recited in claim 1, wherein registering the healthcare provider comprises:

verifying credentials of the healthcare provider by a local administrator with the global database application at a client machine networked with the central database;

providing, by the local administrator, an electronic signature to a client machine networked with the central database accessible by a master administrator; and approving the registration by the master administrator based on information received by the local administrator.

7. The method recited in claim 1, wherein the healthcare provider is chosen from a plurality of health care providers by the registered payer.

* * * * *